United States Patent

Hara

Patent Number: 5,699,905
Date of Patent: Dec. 23, 1997

[54] SHEET FOR HOLDING INFORMATION RECORDING CARRIERS

[76] Inventor: Hiroshi Hara, 2-1-216, Shinkawa 2-chome, Chuo-ku, Tokyo 104, Japan

[21] Appl. No.: 600,994

[22] PCT Filed: Jan. 19, 1995

[86] PCT No.: PCT/JP95/00046

§ 371 Date: Mar. 5, 1996

§ 102(e) Date: Mar. 5, 1996

[87] PCT Pub. No.: WO96/02441

PCT Pub. Date: Jan. 2, 1996

[30] Foreign Application Priority Data

Jul. 15, 1994 [JP] Japan .................. 6-186498

[51] Int. Cl.⁶ ............................................. B65D 85/57
[52] U.S. Cl. ................................ 206/308.1; 206/308.3
[58] Field of Search ........................ 206/449, 454, 206/456, 308.1, 308.2, 308.3

[56] References Cited

U.S. PATENT DOCUMENTS

| | | | |
|---|---|---|---|
| 4,236,635 | 12/1980 | Namiki | 206/456 |
| 4,676,374 | 6/1987 | Wilkins | 206/308.3 |
| 4,724,956 | 2/1988 | Ozeki | 206/456 |
| 4,928,828 | 5/1990 | Cohen | 206/456 |
| 5,011,016 | 4/1991 | Ozeki | 206/456 |
| 5,226,537 | 7/1993 | Ozeki | 206/456 |
| 5,529,183 | 6/1996 | Nishikawa | 206/456 |

FOREIGN PATENT DOCUMENTS

| | | |
|---|---|---|
| 145758 | 9/1984 | Japan . |
| 45369 | 1/1992 | Japan . |
| 45977 | 2/1992 | Japan . |
| 584676 | 11/1993 | Japan . |
| 9009332 | 8/1990 | WIPO . |

*Primary Examiner*—Jimmy G. Foster
*Attorney, Agent, or Firm*—Birch, Stewart, Kolasch & Birch, LLP

[57] ABSTRACT

This invention provides a sheet made of a synthetic resin for holding information recording carriers in the form of small thin plates such as floppy disks. Index strips are removably formed in the holding sheet, and an insertion groove for mounting the removed index strips is formed on one side edge of the holding sheet, whereby an information recording carrier held in the sheet can easily be found. The elements constituting the holding sheet do not overlap when viewed from the front side and back side of the holding sheet, so that the holding sheet can be produced by injection molding wherein the mold is moved in only one direction perpendicular to the plane of the holding sheet. Thus, the holding sheet is suited for large scale production and its production cost is low.

13 Claims, 12 Drawing Sheets

SHEET FOR HOLDING INFORMATION RECORDING CARRIERS

TECHNICAL FIELD

The present invention relates to a sheet for holding information recording carriers, which is used for containing, pigeonholing and storing information recording carriers which are in the form of small thin plates, such as floppy disks and CD-ROM disks. More particularly, the present invention relates to a sheet for holding information recording carriers, which is mainly made of a synthetic resin such as ABS resin, which is suited for being stored in binders and cabinets.

BACKGROUND ART

With the recent progress of information-oriented society, electronic equipment such as various computers and word processors, which deal with characters, symbols and graphic information are now widely used in various fields.

As media for recording characters, symbols and graphic information, which are used with such electronic equipment, information recording carriers such as floppy disks, CD-ROM disks and the like that magnetically record the information, are often used. This is because floppy disks, CD-ROM disks and the like have large memories, and each disk is small and thin so that ease of handling of the disk is good.

For pigeonholing and storing information recording carriers such as floppy disks, a holding sheet as disclosed in Japanese Patent Publication (Kokoku) Nos. 4-5369 and 4-5977 is conventionally used.

This holding sheet basically comprises one synthetic resin sheet; a binding margin formed on one side edge of the synthetic resin sheet, which has a plurality of binding holes; a plurality of rectangular cavities for holding information recording carriers, which are formed in the surface of the synthetic resin sheet; and a pressing strip for holding the information recording carrier, which extends from a side wall of each of the rectangular cavity into the inner region of the cavity. To ensure ease of insertion and removal of the disks, reliability of holding and sufficient strength of the holding sheet, improvements are made, such as providing the bottom plates of the rectangular cavities with pillar portions, making the cut holes small, and forming guide portions for guiding the information recording carriers.

There is also a conventional holding sheet as disclosed in Japanese Laid-open Utility Model Application (Kokai) No. 5-84676, in which the portions for holding floppy disks are formed on both sides of the sheet such that the portions are rotatably mounted so as to enable removal of the disks from one side, and in which hanging members for hanging the sheet in a cabinet are provided, that are mounted on the upper portions of both sides of the sheet and that can be drawn out from the sheet.

However, with the above-mentioned conventional sheets for holding information recording carriers, there is no measure for identifying each floppy disk at a glance when the holding sheets are stored in a binder or are stored in a cabinet by hanging. Therefore, it is troublesome to identify each floppy disk (information recording carrier) when a floppy disk is to be taken out. Further, the conventional information recording carries have drawbacks in that their structures are complicated, forming the sheets by molding is troublesome, and costs for producing the sheets are high.

SUMMARY OF THE INVENTION

Accordingly, an object of the present invention is to provide a sheet for holding information recording carriers that overcomes such drawbacks of the conventional sheets for holding information recording carriers, that has indices which enable a person to easily find the desired information recording carrier such as a floppy disk held in the sheet.

Another object of the present invention is to provide a sheet for holding information recording carriers, that has a simple structure, that may be formed by injection molding in which the mold is moved only in one direction, that are easy to produce and suited for large scale production, and with that the production cost is small.

Still another object of the present invention is to provide a sheet for holding information recording carriers, which may be contained in any of a binder, cabinet, file box and the like by using separately formed hanging members that are held in the holding sheet when the hanging members are not used, thereby preventing the hanging members from being lost.

The present invention provides a sheet for holding information recording carriers comprising a binding margin formed on one side edge of the sheet, which has a plurality of binding holes; a plurality of rectangular cavities for holding information recording carriers, which are formed in the surface of the sheet; and a pressing strip for holding the information recording carrier, which extends from a side wall of each of the rectangular cavity into the inner region of the cavity; wherein one or more index strips are removably formed in the bottom plate of each of the rectangular cavities, and an insertion groove for mounting the removed index strips, which groove is formed on the side edge opposite to that on which the binding margin is formed. Thus, by removing the index strip and mounting it by inserting it into the insertion groove, one can easily identify the information recording carrier contained in the rectangular cavity in the holding sheet.

The index strip is made of a part of the bottom plate, and comprises a portion to be inserted into the insertion groove, and a display surface for displaying characters and similar indicia. The index strip is removably connected to the bottom plate. Therefore, when the index strip is not used, it is used as a part of the bottom plate, so that there is no possibility for the index strip to be lost. When the index strip is used, it is conveniently removed from the bottom plate by cutting connection portions. Further, a plurality of index strips may be formed in each bottom plate, thereby forming the index strips in a number more than that actually used. By so doing, the remaining index strips may be used as spares.

The index strip is so formed that the side of the portion to be inserted is made wider. On the other hand, the insertion groove is so formed that the size of the groove corresponds to the size of the index such that its side of opening is narrower and the side of the bottom is wider. The index strip is inserted into the insertion groove from an end of the groove and slid along the insertion groove until it is located at the desired position. Thus, the index strips may be rearranged as required, and the location of an index strip may be changed in accordance with the location of the corresponding information recording carrier being held. By mounting the index strips like this, the desired information recording carrier may very easily be taken out when the holding sheet is bound in a binder or hung in a cabinet.

The insertion groove for mounting the above-described index stips is so constructed that the side walls of the groove are constituted by a number of projection strips which are alternately arranged. Thus, the groove may be formed by injection molding in which the mold is moved only in the direction perpendicular to the surface of the holding sheet.

Hanging members for hanging the holding sheet in a cabinet are removably mounted on the vicinities of both ends of the insertion groove formed on the side edge of the holding sheet. By virtue of these hanging members, the holding sheet may easily be held not only in binders but also in cabinets.

The hanging members may be removably mounted on the holding sheets by forming mounting projections on the hanging member and corresponding mounting holes in the holding sheet, and fitting the mounting projections into the mounting holes. Alternatively, the mounting holes may be formed in the hanging members and the mounting projections may be formed on the holding sheet, the mounting holes and the mounting projections being fitted by one-touch.

The hanging member has a hook portion being hung on the upper edge of either of the walls of the drawer of the cabinet. The hanging members are used when the sheet is held in a cabinet, and are removed when the sheet is filed in a binder.

In cases where hanging members having mounting holes are used, holding projections may be formed on the backside of the bottom plates of rectangular cavities and the hanging members may be held by inserting the holding projections into the mounting holes in the hanging members. It is preferred to form projections on the side surface of the hanging member, which serve to firmly hold the hanging member by urging the side wall of the holding sheet or the side wall of the back side of the rectangular cavity when the hanging member is fitted into the mounting projections or holding projections.

It is preferred to form a finger cavity in the side wall of each of the rectangular cavities, which side wall is opposite to the side wall on which the pressing strip is formed, that is, in the side wall from which the information recording carrier is inserted so as to make it easy to remove the information recording carrier. It is further preferred to give a gradient to the bottom plate of each rectangular cavity such that the side through which the information recording carrier is inserted is high and the side of the wall on which the pressing strips are formed is low, because the side end of the information recording carrier held in the cavity is well exposed to the above-mentioned finger cavity so that the removal of the information recording carrier can be carried out more easily. Further, by giving such a gradient to the bottom plate, insertion of the information recording carrier can be carried out more smoothly, so that it is preferred.

All elements of the sheet for holding information recording carriers according to the present invention do not overlap each other when the sheet is viewed from the front side and from the back side, so that the holding sheet is single-ply. Therefore, the holding sheet can be produced by injection molding in which the mold is moved only in the direction perpendicular to the surface of the holding sheet. By virtue of this, the holding sheet can easily be produced and is suited for large scale production. More particularly, the sheet for holding information recording carriers according to the present invention can be produced only by filling by injection a synthetic resin (ABS resin excelling in elasticity and strength is preferred) melted by heating into a pair of molds including a stationary mold and a movable mold, cooling the resin to mold the same into the prescribed shape, and releasing the movable mold in the direction perpendicular to the sheet surface. Thus, the holding sheet can easily be produced and is suited for large scale production.

By virtue of the above-described constitution, the sheet for holding information recording carriers according to the present invention has the following excellent advantageous effects.

(1) When the sheet for holding information recording carriers is filed in a binder or hung in a cabinet, the desired information recording carrier such as a floppy disk, CD-ROM disk or the like can easily be identified by virtue of the index strip.

(2) The sheet for holding information recording carriers has a comparatively simple structure. Particularly, all elements do not overlap each other when the sheet is viewed from the front side and back side so that the sheet is single-ply. Therefore, the holding sheet can be produced by injection molding in which the mold is moved only in the direction perpendicular to the surface of the holding sheet. By virtue of this, the holding sheet can easily be produced and is suited for large scale production.

(3) Since hanging members for hanging the holding sheet in a cabinet or the like are removably mounted on the vicinities of both ends of the insertion groove formed in the side edge, the holding sheet may be contained not only in a binder but also in a cabinet or the like.

(4) In cases where hanging members having mounting holes are employed, when the hanging members are not used, they may be held by being fitted into the holding projections formed on the back side of the bottom plates of the rectangular cavities of the holding sheet, so that there is no possibility for the hanging members to be lost. Further, since the hanging members are provided with projections on the side edges thereof, the hanging members are not easily removed because the projections urge the side wall of the holding sheet or the side wall of the back side of the rectangular cavity when the hanging members are fitted into the mounting projections or holding projections.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

12 is a perspective view showing the state wherein the sheets for holding information recording carriers are hung using the hanging members.

DETAILED DESCRIPTION OF THE PREFERRED EMBODIMENTS

The present invention will now be described in more detail referring to the accompanying drawings.

FIGS. 1–8 show the structure of the sheet for holding information recording carriers according to the present invention, which has index strips. A holding sheet 1 produced by injection of a synthetic resin, such as ABS resin melted by heating, into molds, cooling the resin to solidify the same and releasing the solidified resin from the mold, has receiving portions for holding information recording carriers 10 such as 3.5 inches floppy disks and CD-ROM (the term "CD-ROM" herein means the circular CD-ROM disk enclosed in a square jacket), which receiving portions are arranged in two columns and three lines. The holding sheet has a binding margin 2 having a plurality of binding holes 2a at one side edge (the left side in the front view shown in FIG. 1).

Each rectangular cavity 3 serving as the receiving portion of the information recording carrier 10 has a bottom plate 3a and is bordered by substantially vertical surrounding walls. On the side of the binding margin of the surrounding walls, that is, on the side wall 3c of the each cavity, which side wall is located opposite to the side from which the information recording carrier is inserted, a pressing strip 4 for holding the information recording carrier is formed that extends from substantially the center portion of the side wall 3c to the inside of the rectangular cavity is formed. In a side wall 3b of the side from which the information recording carrier is inserted, that is, on the side wall 3b opposite to the side wall 3c, a finger cavity 5 in the form of an arc is formed so as to make it easy to remove the information recording carrier.

The pressing strip 4 is made during the injection molding utilizing a part of the bottom plate 3a. The portion of the bottom plate facing the surface of the pressing strip is open. The pressing strip 4 has an elasticity and strength sufficient for holding the information recording carrier 10. The tip 4a of the pressing strip 4 is outwardly curved so as to make it easy to insert the information recording carrier (see FIGS. 2 and 3).

Figure 2:
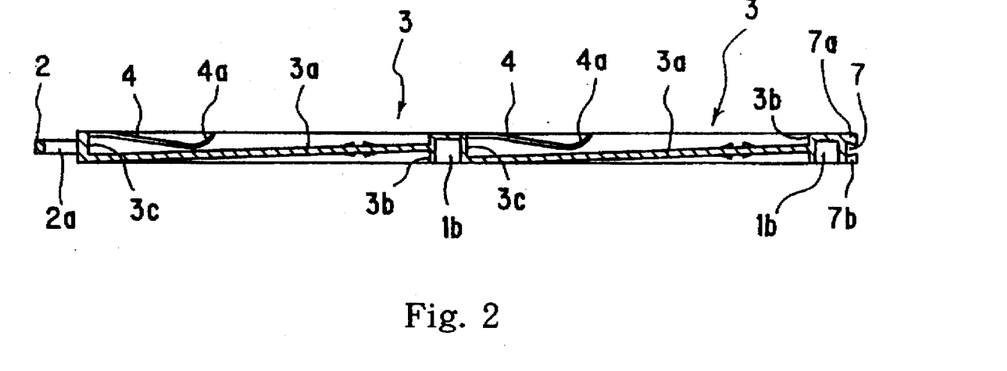
FIG. 2 is a cross-sectional view taken along I—I line in FIG. 1.
Figure 3:
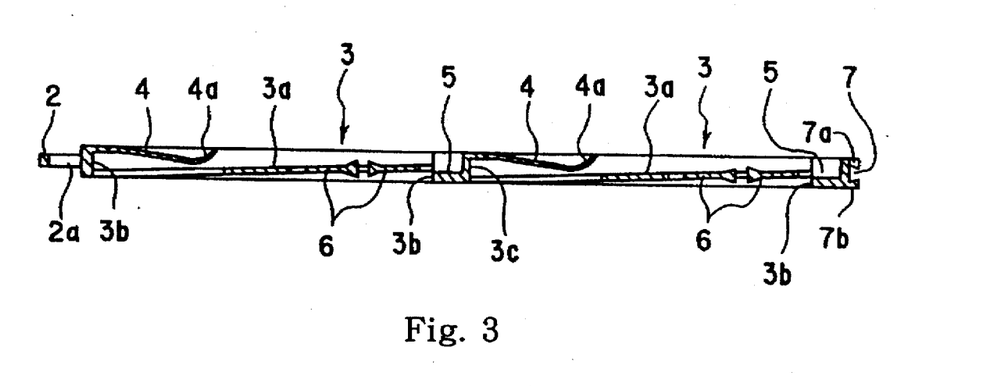
FIG. 3 is a cross-sectional view taken along II—II line in FIG. 1.
Figure 4:
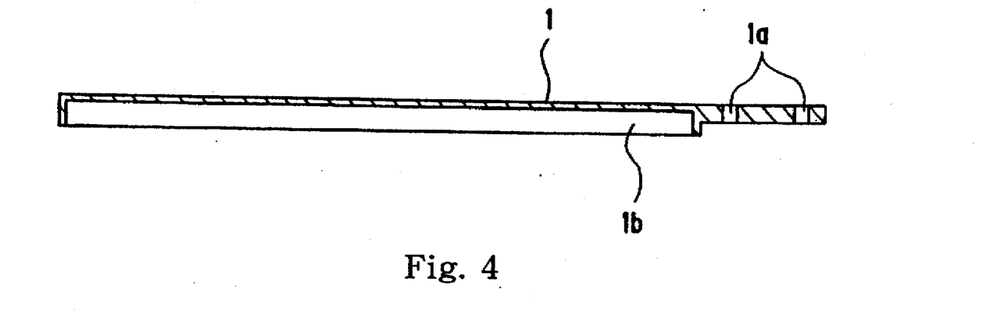
FIG. 4 is a cross-sectional view taken along III—III line in FIG. 1.
Figure 5:
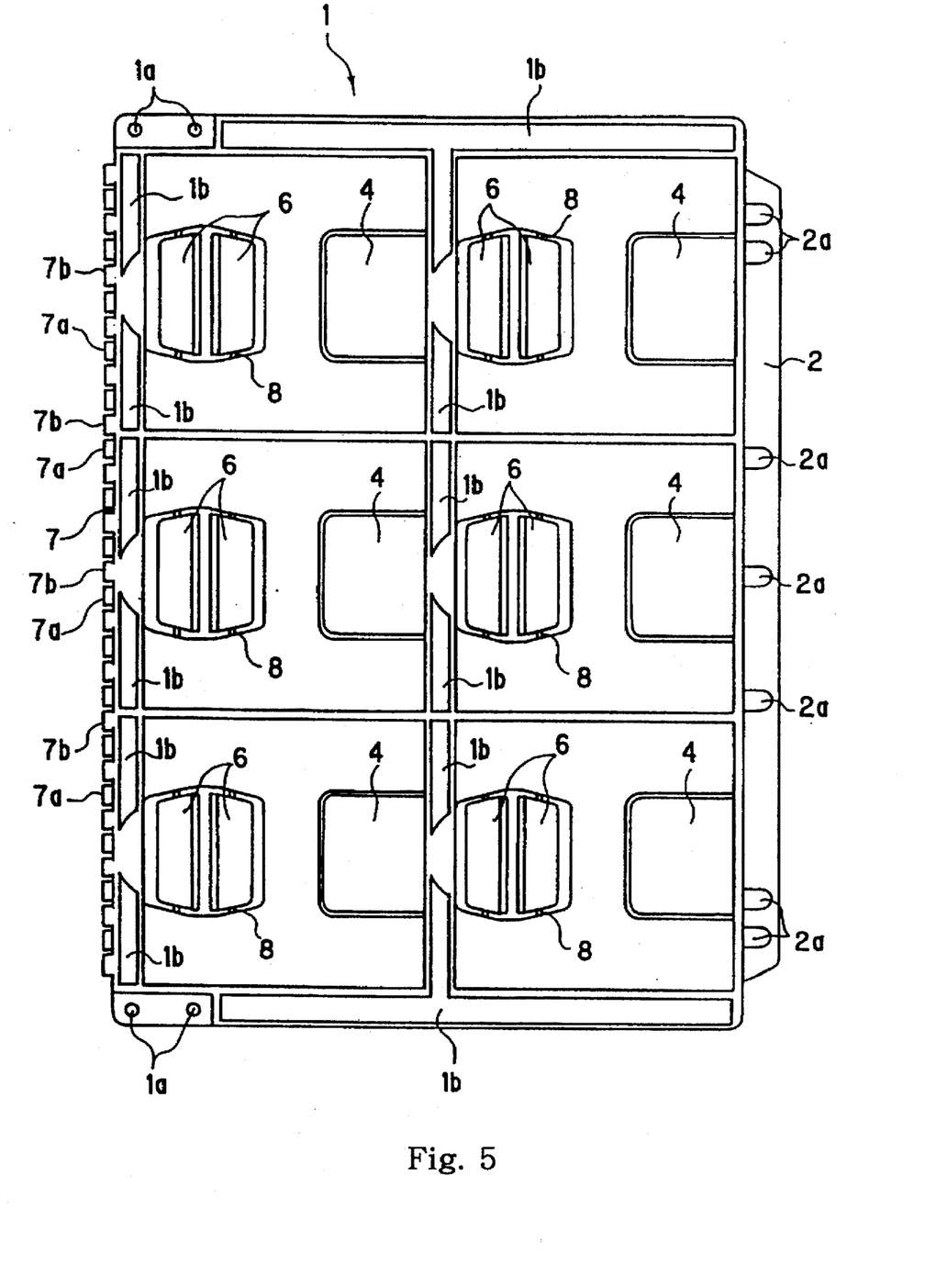
FIG. 5 is a back view showing one embodiment of the sheet for holding information recording carriers according to the present invention.

The bottom plate 3a of each rectangular cavity 3 is sloped such that the side from which the information recording carrier 10 is inserted is higher, and the side of the wall on which the pressing strip 4 is formed is lower, so as to enhance ease of insertion as well as stable holding and ease of removal after placing the information recording carrier (see FIGS. 2 and 3). Especially, by virtue of the fact that the side from which the information recording carrier is inserted is made higher and by virtue of the above-mentioned finger cavity 5 formed in the side wall 3b of the insertion side, an end of the held information recording carrier 10 can be exposed to the outside of the rectangular cavity 3, so that the information recording carrier 10 can be easily removed by hooking a finger on the end of the information recording carrier. In order to make the hooking of the finger easier, the finger cavity 5 is preferably a little deeper than the bottom plate 3a of the insertion side.

In a part of the bottom plate 3a, index strips 6 are removably provided. On the other hand, an insertion groove 7 for mounting the index strips 6 is formed along substantially the full length of the side edge (the right side in FIG. 1) opposite to the side in which the binding margin 2 of the holding sheet 1 is formed.

Figure 1:
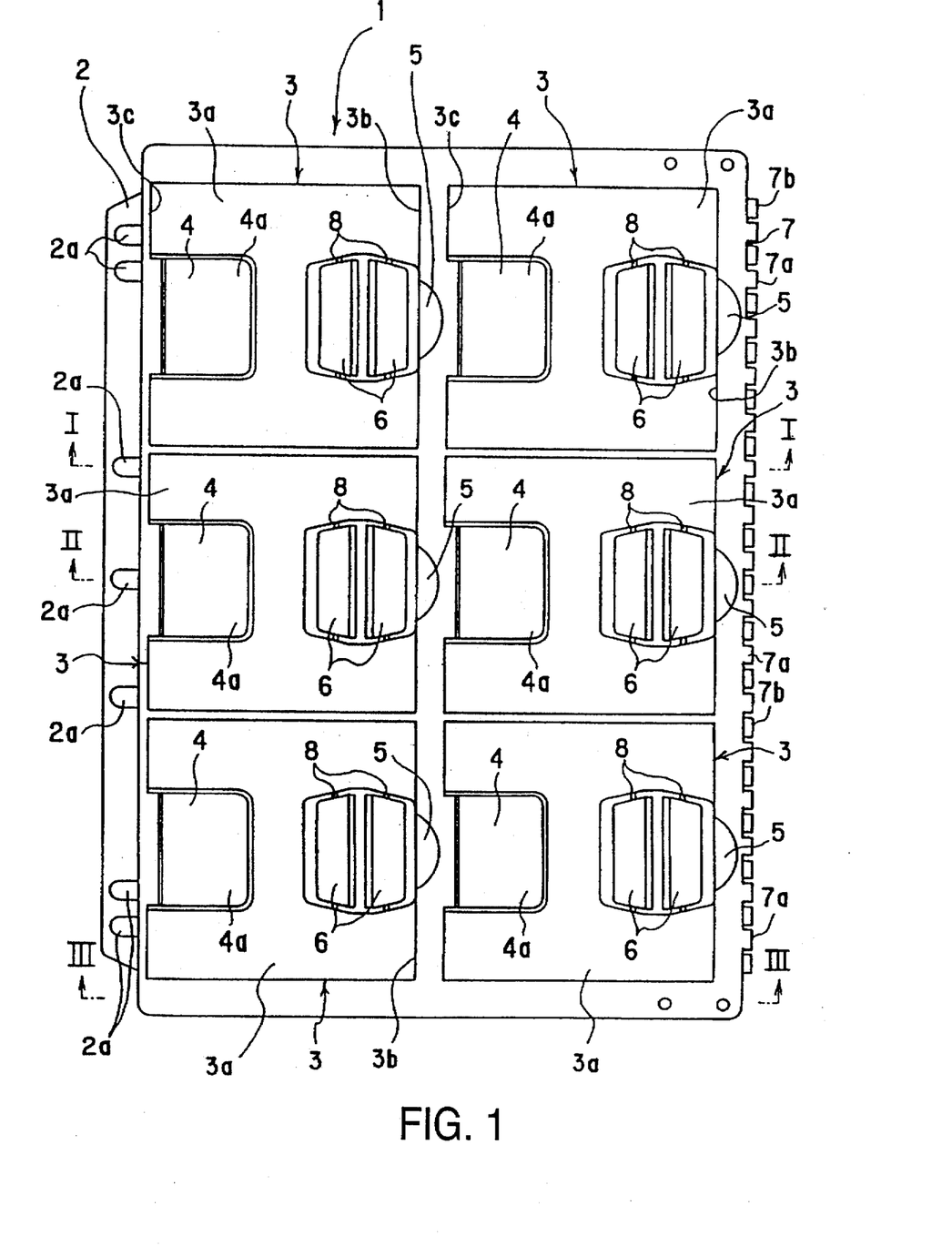
FIG. 1 is a front view showing one embodiment of the sheet for holding information recording carriers according to the present invention.

The entire shape of the index strip 6 is substantially trapezoidal, and an insertion portion 6a to be inserted into the insertion groove 7 is formed such that the tip thereof is wider. The front and back surfaces of the index strip 6 are display surfaces 6b for displaying characters and similar indicia. The index strip 6 is formed utilizing a part of the bottom plate 3a during injection molding, and is provisionally connected to the bottom plate 3a through right and left connection portions 8. Thus, when the index strip 6 is to be used, it can easily be removed by clamping the index strip 6 with fingers and breaking the connection portions 8. Although in this embodiment, as shown in FIG. 1, two index strips 6 are formed in one bottom plate 3a, only one index strip may be formed or not less than three index strips may be formed in one bottom plate 3a. Although the number of the index strips which can be formed in one bottom plate is naturally restricted by the size of the bottom plate 3a and the size of the index strip 6, an appropriate number of index strips 6 may be formed in the restricted range. If the sizes of the index strips 6 are small, not less than three index strips may be formed.

Figure 7:
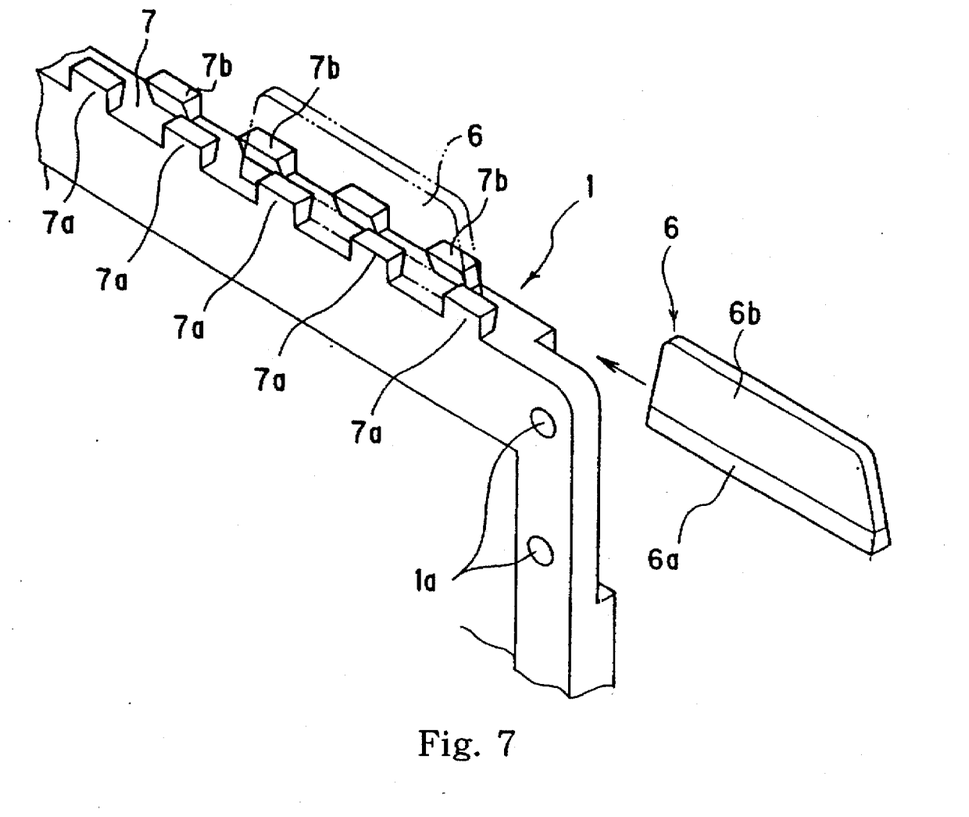
FIG. 7 is a perspective view showing how to mount the index strip on the sheet for holding information recording carriers.
Figure 8:
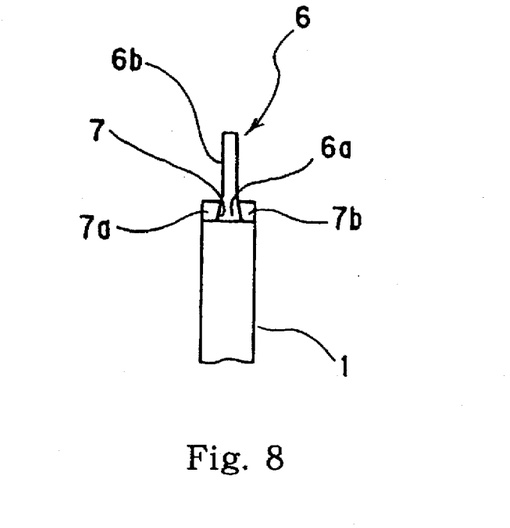
FIG. 8 is a side view showing the state wherein the index strip is mounted.

As shown in FIG. 8 in detail, the insertion groove 7 is formed such that the side of the opening is narrower and the side of the bottom of the groove is wider, so as to correspond with the insertion portion 6a of the index strip 6. By virtue of this, as shown in FIG. 7, the insertion portion 6a of the index strip whose tip is wider can be inserted into the insertion groove 7 from an end of the insertion groove, and the inserted index strip is prevented from falling out.

Both side walls constituting the insertion groove 7 are formed such that each of the side walls is alternately cut off such that the side walls do not overlap when viewed from the front side and from the backside. That is, the side walls constituting the insertion groove 7 are constituted by a number of projection strips 7a and 7b which are alternately arranged. By virtue of such a structure, the insertion groove can be formed by injection molding in which the mold is moved in only one direction perpendicular to the plane of the holding sheet. In spite of such a structure, since the insertion groove can be formed by a number of projection strips 7a and 7b, there is no problem on the strength of the insertion groove.

Figure 6:
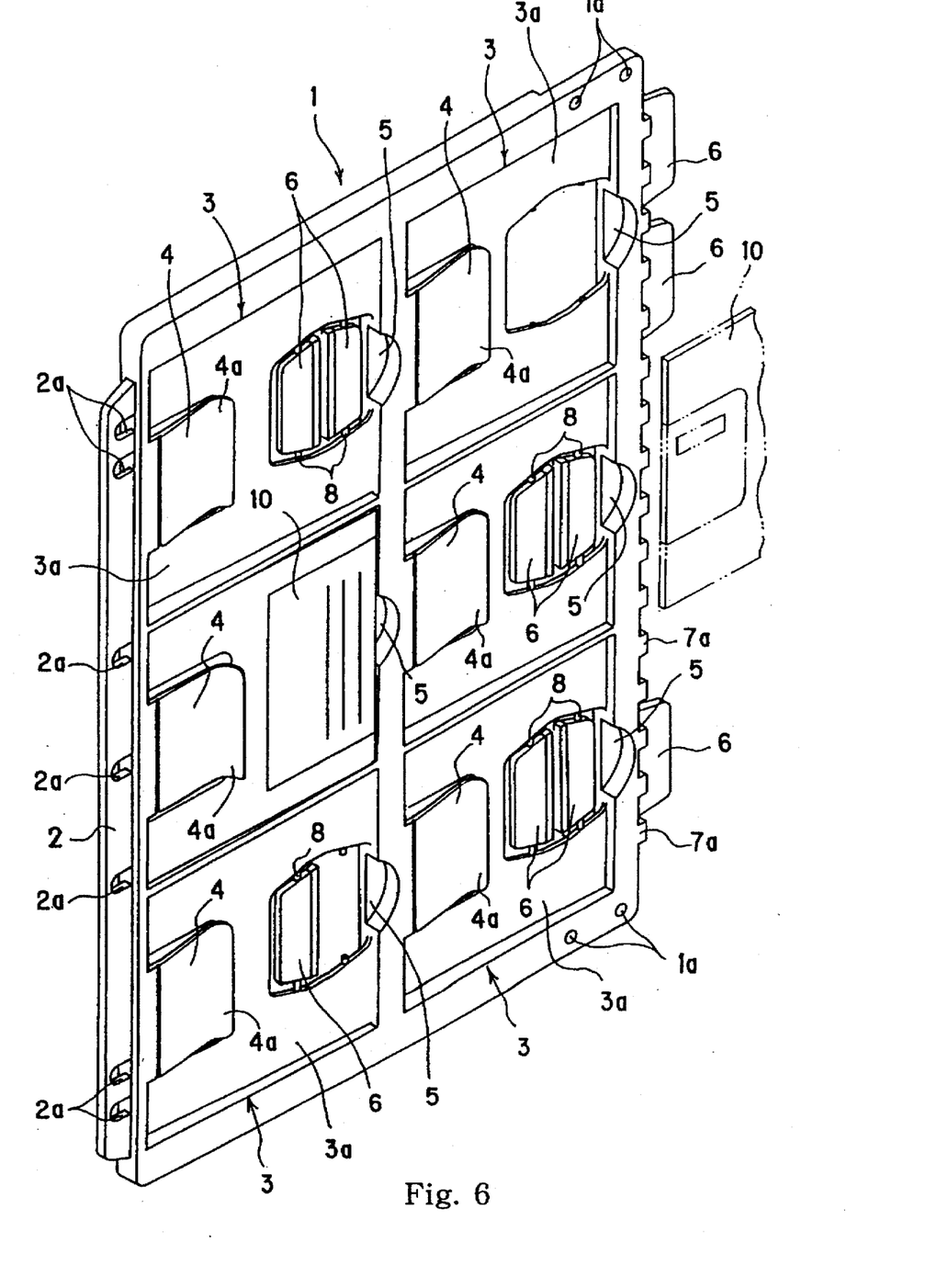
FIG. 6 is a perspective view showing the state of use of the holding sheet of the embodiment shown in FIG. 5.

The index strip 6 formed as mentioned above is inserted into the insertion groove 7 from an end of the insertion groove and slid along the insertion groove to the desired position (see FIGS. 6 and 7). One index strip 6 can be used for each information recording carrier held, and the position of the index strip 6 can be optionally selected depending on the position of the information recording carrier to be tagged.

In this embodiment, two index strips 6 are formed in each bottom plate 3a, so that a total of twelve index strips are formed, and maximally six index strips 6 can be inserted into the insertion groove 7 on the edge of the holding sheet. Therefore, in this embodiment, the remaining six index strips can be stored as spares, and the spare index strips 6 can be removed and used when required.

Figure 9:
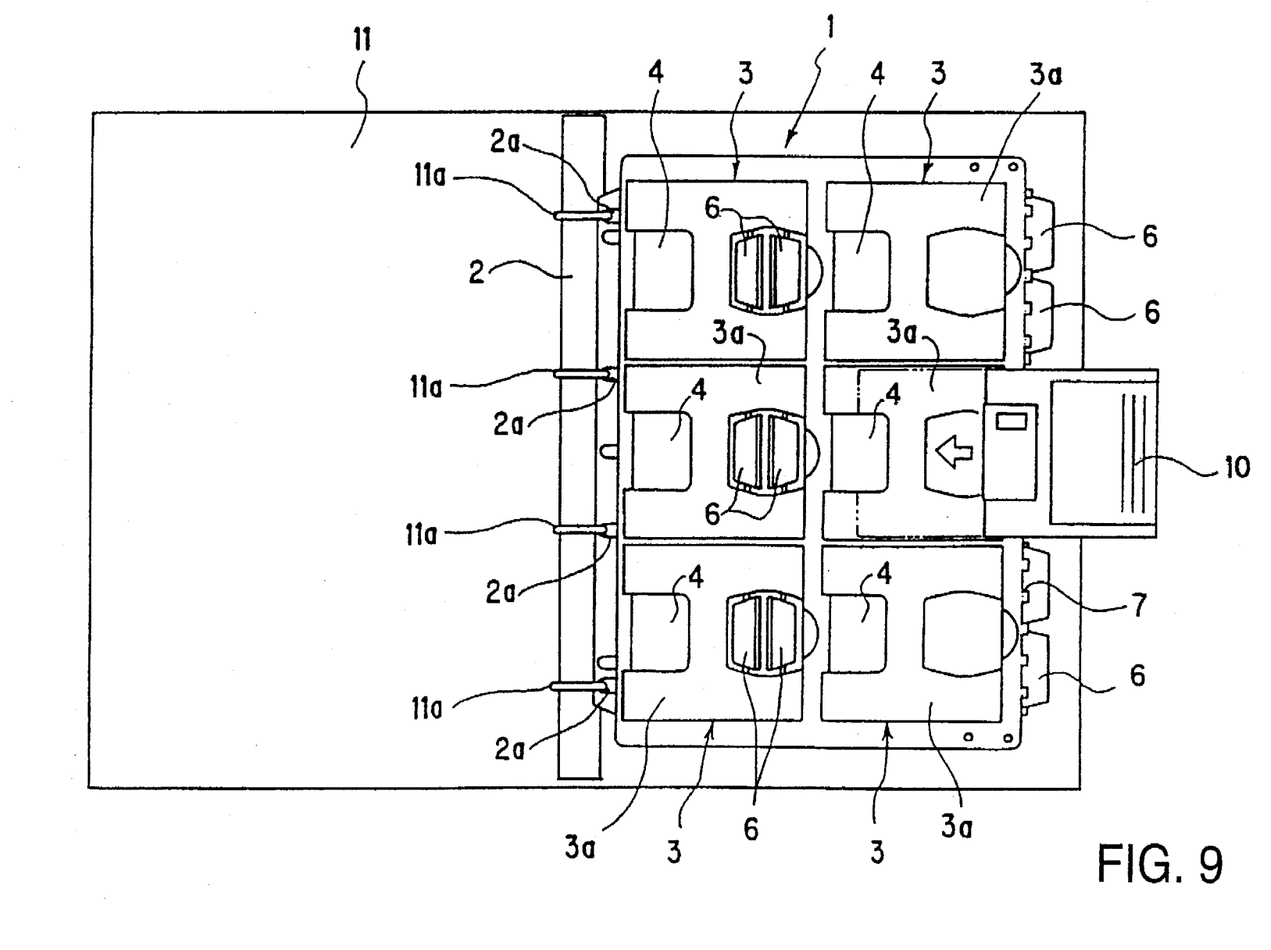
FIG. 9 is a view showing the state wherein the sheet for holding information recording carriers is filed in a binder.

FIG. 9 shows the state in which the sheet 1 for holding the information recording carriers, according to the present embodiment is bound in a binder 11 via rings 11a. Thus, by inserting the rings 11a of the binder 11 into the binding holes 2a of the binding margin provided in one side of the sheet, a plurality of the sheets can be filed in the binder 11. In this case, by inserting the index strip 6 into the insertion groove 7 formed on the other edge of the sheet, the information recording carrier being held can be indicated. Thus, the needed information recording carrier 10 can be easily found at a glance.

In this embodiment, since the left side of the sheet is bound, the information recording carrier 10 such as a floppy disk is inserted into and taken out from the rectangular cavity through the right side of the cavity. In the state in which the sheet is bound in the binder 11, the pressing strip 4 is positioned on the left side of the cavity and not on the lower side of the cavity. However, since the information recording carrier 10 is surrounded by the side walls of the cavity and is urged against the bottom plate 3a by the elastic pressing strip 4, the information recording carrier will not fall out and is securely held.

Figure 10:
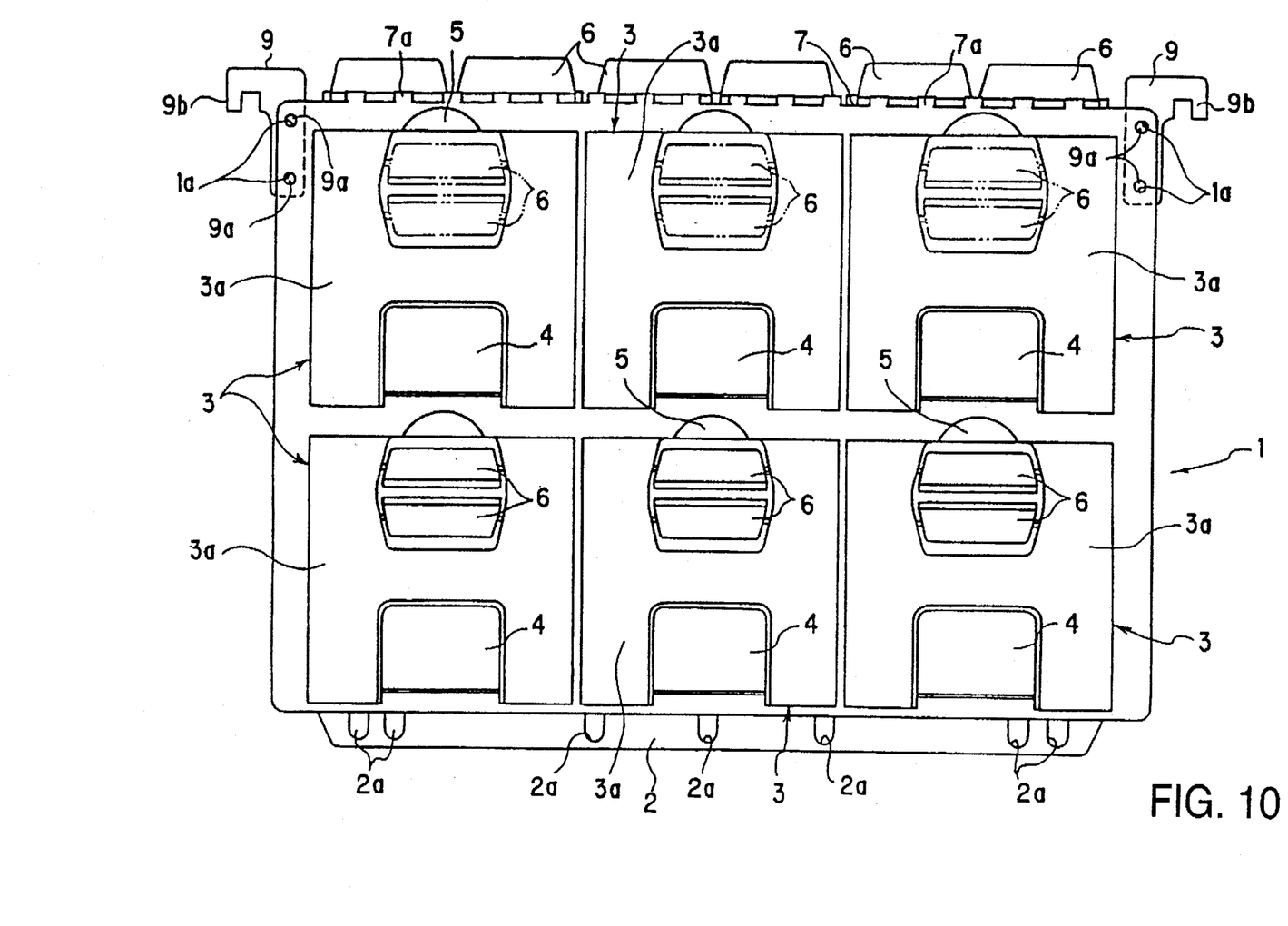
FIG. 10 is a front view showing the state wherein the hanging members are mounted on the sheet for holding information recording carriers.
Figure 11:
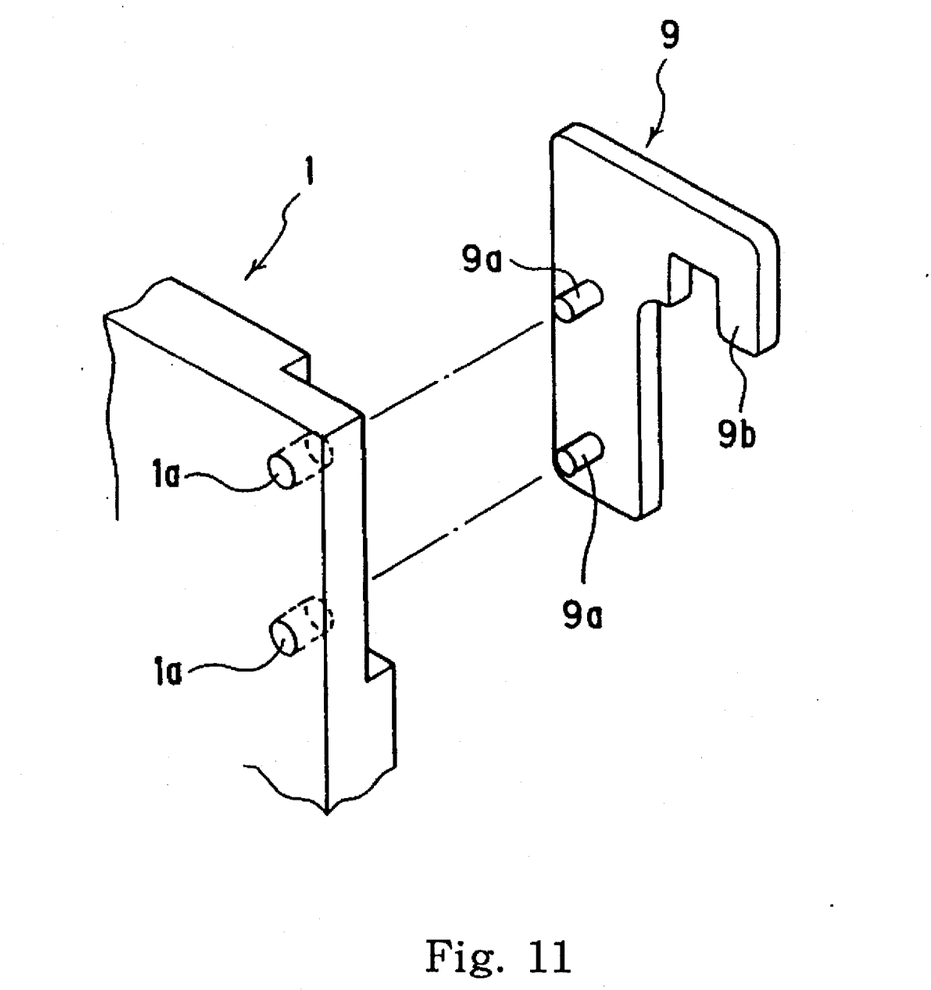
FIG. 11 is a perspective view showing how to mount the hanging members. FIG.
Figure 12:
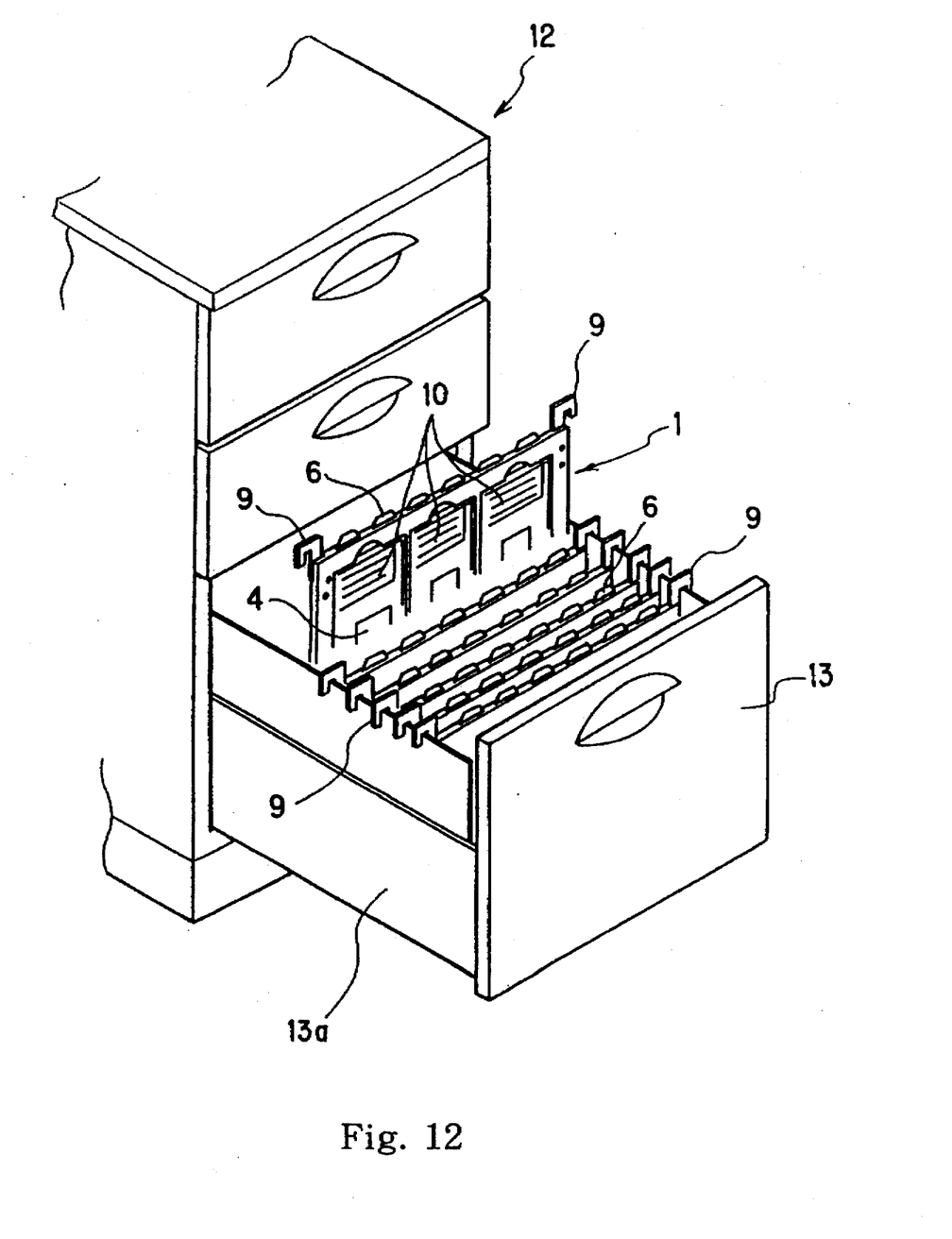

FIGS. 10 to 13 are views for explaining the case wherein separately formed hanging members 9 are mounted. For example, FIG. 12 shows the state wherein the holding sheet 1 is contained in a cabinet made of metal. In this embodiment, to make it possible to be contained in a cabinet, the holding sheet 1 is used such that the side on which the index strips are mounted is upwardly directed, and hanging members 9 for hanging the holding sheet in the cabinet can be mounted in the vicinity of both ends of the insertion groove 7 formed on the side edge of the holding sheet 1.

In FIGS. 10 to 12, mounting holes 1a are formed in vicinity of the both ends of the insertion groove 7 for receiving the index strips 6, which insertion groove is formed in the holding sheet 1. Two hanging members 9 having projections 9a to be fitted into the mounting holes 1a and hook portions are provided. The hanging members 9 are formed separately from the holding sheet 1. Since the projections 9a are made of a synthetic resin such as polypropylene which is a little harder than ABS resin, the projections 9a have sufficient strength. As shown in FIG. 11 in detail, the hanging members 9 are fitted into the mounting holes at both ends of the holding sheet. The hook portions 9b of the mounted hanging members 9 are hooked on the upper ends of both walls 13a of the drawer 13 of the cabinet 12, thereby hanging the holding sheet in the cabinet 12. By using the holding sheets as mentioned above, the sheets 1 for holding information recording carriers according to this embodiment can be contained by arranging the holding sheets in a row in the cabinet made of metal.

The position at which the hanging members 9 are mounted may be controlled by changing the position of the mounting holes 9a or by forming a plurality of mounting holes 9a at appropriate positions. For example, when the height of the both walls 13a of the drawer of the cabinet 12 is low, the hanging members may be mounted at a low position accordingly. The holding sheet 1 may be held by mounting a filing rail with a prescribed height in the drawer 13 of the cabinet 21 and hooking the hanging members 9 over the filing rail.

When the holding sheets are contained in the cabinet 12 in this manner, the index strips 6 are positioned at the uppermost sides of the holding sheets 1. Therefore, when the drawer 13 of the cabinet 12 is opened, the wanted information recording carrier 10 can be easily found at a glance. In this case, the information recording carriers 10 are not dropped even if the drawer is roughly opened and closed, because the pressing strips 4 are positioned at the lower sides of the cavities, the information recording carriers 10 are surrounded by side walls of the cavities and are strongly urged against the bottom plates 3a by the elastic pressing strips.

Figure 13:
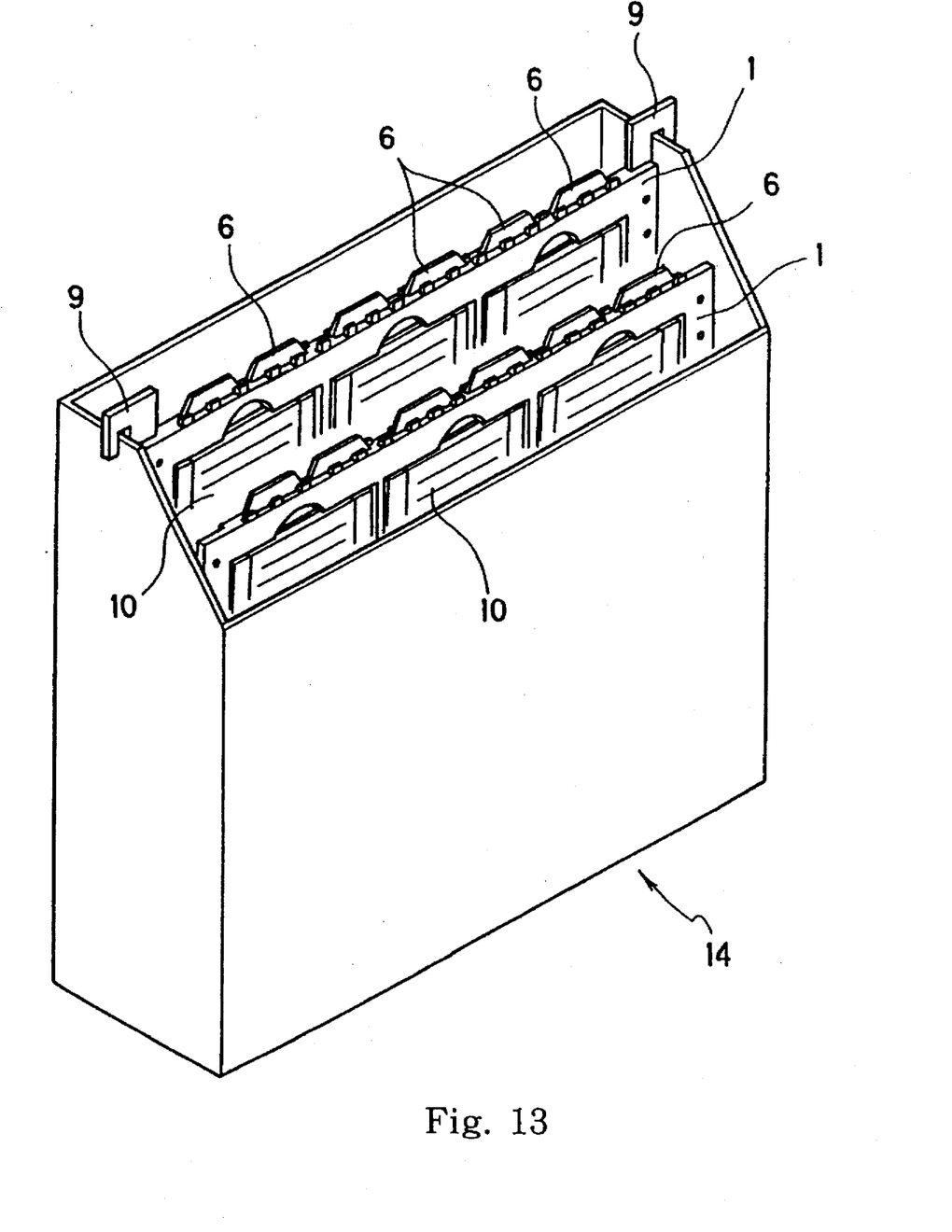
FIG. 13 is a perspective view showing the state wherein the sheets for holding information recording carriers are contained in a box file using the hanging members.

The sheet 1 for holding information recording carriers can be contained in a box file by using the hanging members 9. That is, as shown in FIG. 13, the holding sheet 1 can be hung by hooking the hanging members 9 on the upper edge of the side walls of a commercially available box file 14; or by removing the hanging members 9 and placing the holding sheets as they are in the box file. In this case, by virtue of the index strips 6 located at the upper ends of the sheets, the wanted information recording carrier 10 held in the holding sheets can be easily found.

To indicate an information recording carrier 10, the same symbol or the sale sign as placed on the information recording carrier 10 may also be placed on the index strip 6. Alternatively, for example, the index strips can be distinguished by assigning six colors. It is preferred to give serial numbers to a plurality of holding sheets 1 and to give the same numbers to the information recording carriers held in the respective holding sheet.

Although the rectangular cavities 3 are formed in two columns and three lines in this embodiment, the number of the rectangular cavities is not restricted to this, and may be appropriately changed depending on the size of the information recording carriers 10. The entire size of the holding sheet is preferably one which can be contained in commercially available binders, for example, JIS A4 (width 21 cm, length 29.7 cm).

In this embodiment, since the hanging members 9 are separately provided, the hanging members 9 can be omitted when the sheet is filed in a binder. Therefore, unlike those in which the hanging members are integrally formed, the hanging members are not cumbersome even when the holding sheet is filed in a binder 11. For mounting the hanging members, only mounting holes 1a are opened in the holding sheet 1, so that the molding of the mounting portion of the hanging members are accomplished merely by opening the holes, and the releasing of the molded sheet 1 can be carried out in one direction.

As described above, the elements constituting the sheet 1 for holding information recording carriers according to this embodiment, that is, the binding margin 2, bottom plates 3a of the rectangular cavities, pressing strips 4, index strips 6 and projection strips 7a and 7b, do not overlap each other when viewed from the front side and from the backside. Therefore, injection molding can be carried out by moving the mold only in one direction perpendicular to the plane of the holding sheet. Thus, production of the holding sheet is easy and the holding sheet is suited for large scale production.

In order to ensure elasticity and sufficient strength (impact resistance and durability), it is preferred to form the holding sheet 1 according to the present invention with ABS resin. Further, to ensure strength (hardness) of the projections 9a, the hanging members 9 are preferably formed with polypropylene rather than ABS resin. Still further, in order to prevent the holding sheet 1 from being bent, it is preferred to reduce the resin material by forming a number of grooves 1b from the backside, and to keep the thickness of the sheet as uniform as possible.

Figure 14:
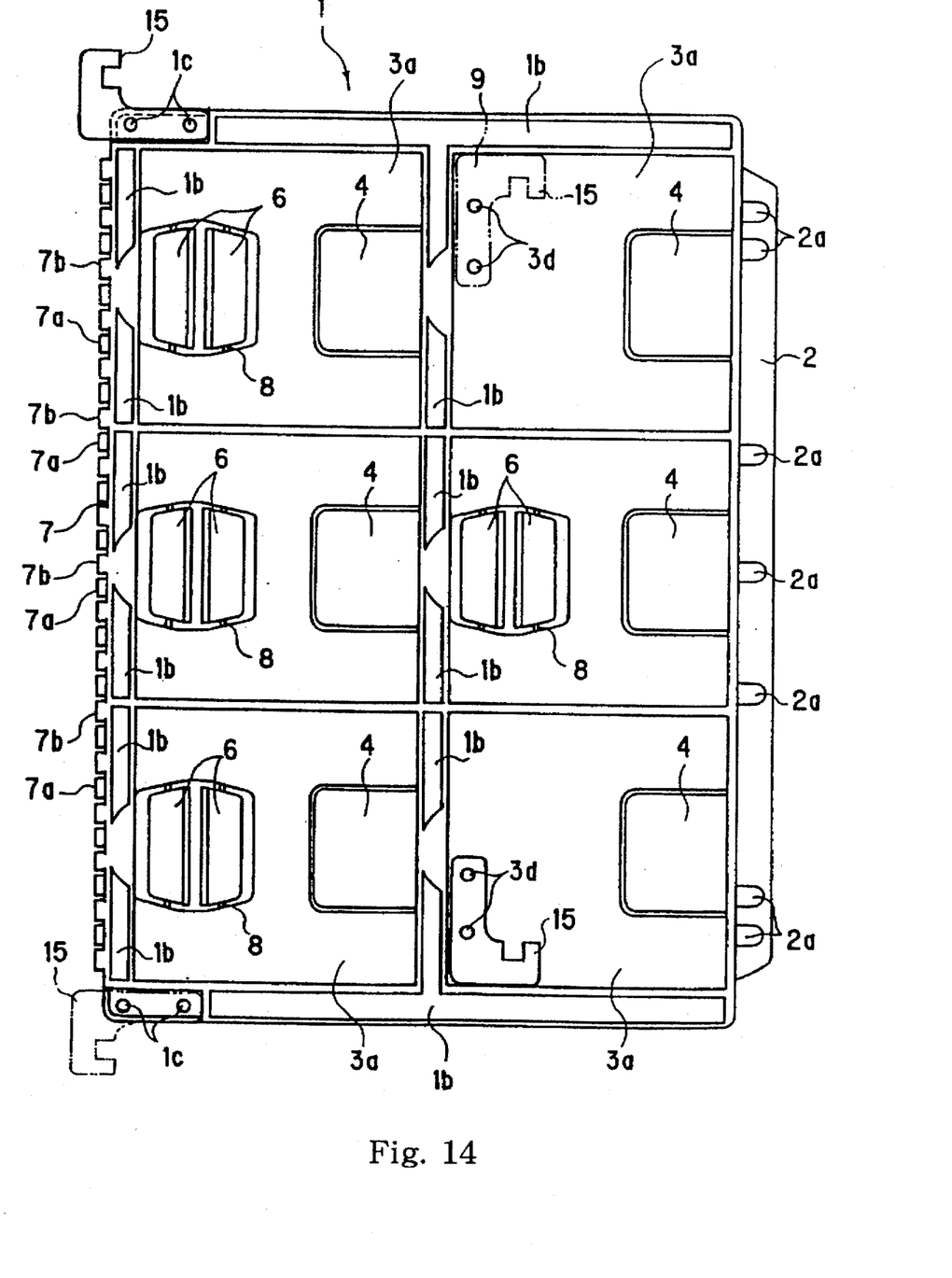
FIG. 14 is a back view showing another embodiment of the sheet for holding information recording carriers according to the present invention.
Figure 15:
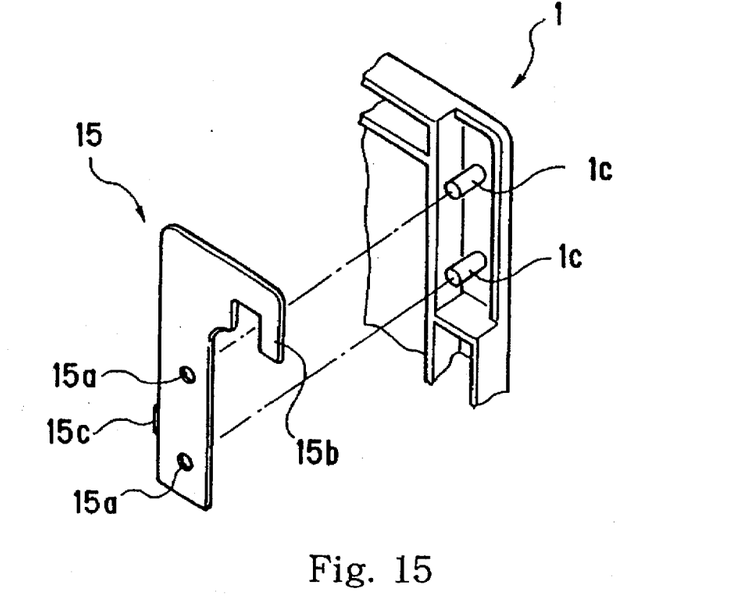
FIG. 15 is a perspective view showing how to mount the hanging member having mounting holes on the mounting projections on the holding sheet.
Figure 16:
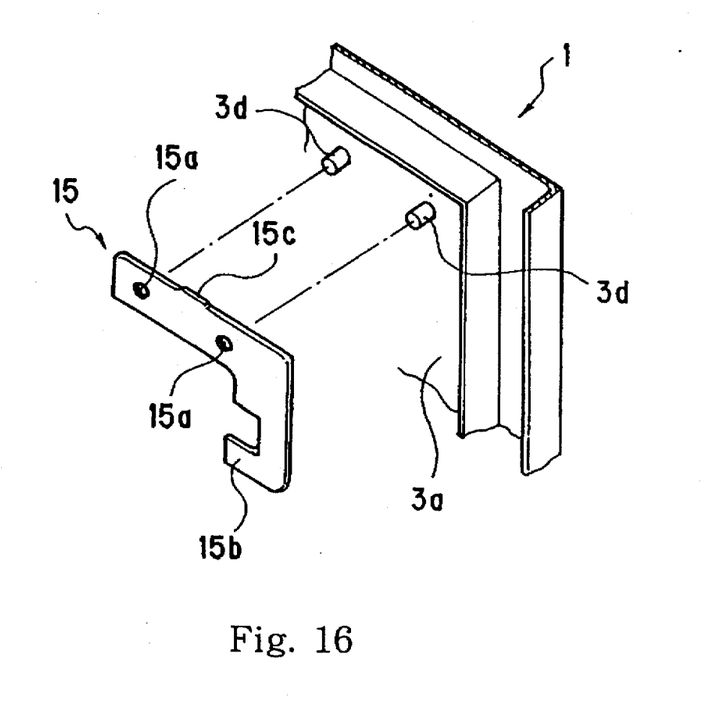
FIG. 16 is a perspective view showing how to mount the hanging member on the holding projections formed on the back side of the bottom plate of the rectangular cavity of the holding sheet.

FIGS. 14–16 show another embodiment according to the present invention. In this embodiment, to removably mount the hanging members at the ends of the holding sheet, mounting holes are formed in the hanging members and mounting projections to be inserted into the mounting holes are formed in the holding sheet. In addition, when the hanging members are not used as hooks, they can be held in the backside of the holding sheet. Since the other elements of this embodiment are the same as those of the above-described embodiment, the same elements are designated by the same reference numbers and the explanations thereof are simplified.

In this embodiment, as shown in the entire back view shown in FIG. 14, mounting projections 1c are formed in the vicinities of both ends of the insertion grooves 7 of the index strips 6, which is formed in the holding sheet 1. Two hanging members 15 having hooks are provided. In the hanging members, mounting holes into which the mounting projections 1c are to be inserted are formed. In the backside of the bottom plates of rectangular cavities 3 of the holding sheet, holding projections 3d for holding the hanging members 15 when the hanging members are not used as hooks are formed. In the rectangular cavities whose bottom plates are provided with the holding projections 3d on the backside thereof, it is not necessary to form the index strips 6. It is sufficient to form two index strips 6 in each of the bottom plates 3a of the four rectangular cavities, that is, a total of eight index strips 6. Even in this embodiment, since maximally six index strips six can be inserted into the insertion groove 7 at the end of the holding sheet, the remaining two index strips 6 can be stored as spares.

The hanging member 15 according to the present invention have mounting holes 15a formed in the two positions in the base portion, a hook portion 15b extended from the base portion, and a projection 15c formed on the side end of the base portion. The projection 15c serves to firmly keep the inserted state by being urged against the side wall of the holding sheet or against the side wall of the backside of the rectangular cavity 3 when the hanging members 15 are fitted to the mounting projections 1c or the holding projections 3d.

As shown in FIG. 15, into the mounting holes of the hanging members 15, the mounting projections 1c at both ends of the holding sheet are inserted to mount the hanging members 15. The hook portions 15b of the hanging members 15 thus mounted are hooked on the upper edges of both sides of the cabinet 12 shown in FIG. 12, thereby hanging the holding sheet 1 in the cabinet 12. By using the holding sheets as mentioned above, the sheets 1 for holding information recording carriers according to this embodiment can be contained by arranging the holding sheets in a row in the cabinet made of metal. Further, when the hanging members 15 are not used, as shown in FIG. 16, the hanging members 15 may be held by inserting the holding projections 3d formed on the back side of the bottom plates of the rectangular cavities 3 of the holding sheet 1 into the mounting holes. By this, the hanging members are conveniently stored and loss of the hanging members can be prevented.

As described above, the sheet for holding information recording carriers according to the present invention is useful for containing, pigeonholing and storing the information recording carriers in the form of a small thin plate, such as floppy disks and CD-ROMs, and is especially suited for being contained in binders, cabinets or box files.

The present invention will become more fully understood from the detailed description given hereinbelow and the accompanying drawings which are given by way of illustration only, and thus are not limtative of the present invention, and wherein.

I claim:

1. A sheet for holding information recording carriers comprising:

a binding margin formed on one side edge of said sheet, said binding margin having a plurality of binding holes;

a plurality of rectangular cavities for holding said information recording carriers, said rectangular cavities being formed in the surface of said sheet;

a plurality of pressing strips for holding said information recording carriers, each of said pressing strips extending from a side wall of a respective one of said rectangular cavities into an inner region of said respective one of said cavities;

at least one index strip removably formed in a bottom plate of each of said rectangular cavities; and an insertion groove for mounting an index strip which has been removed from said bottom plate, said insertion groove being formed on a side edge opposite to that on which said binding margin is formed.

2. The sheet for holding information recording carriers according to claim 1, wherein said at least one index strip has an insertion portion to be inserted into said insertion groove, and a display surface for displaying characters.

3. The sheet for holding information recording carriers according to claim 2, wherein said insertion portion of said at least one index strip is formed such that a tip of said at least one index strip is wider than a remaining portion of said at least one index strip, and said insertion groove is formed such that a first portion of an opening in said insertion groove is narrower than a second portion of said insertion groove, so as to correspond with said insertion portion of said at least one index strip, said at least one index strip being slidably mountable in said insertion groove by inserting said at least one index strip from an end of said insertion groove.

4. The sheet for holding information recording carriers according to claim 1, wherein opposite side walls of said insertion groove are formed by a plurality of projection strips.

5. The sheet for holding information recording carriers according to claim 1, further comprising a finger cavity formed in a side wall of each of said rectangular cavities opposite to a side wall on which said pressing strips are formed.

6. The sheet for holding information recording carriers according to claim 1, wherein the bottom plate of each rectangular cavity is sloped.

7. The sheet for holding information recording carriers according to claim 1, wherein elements constituting said sheet for holding information recording carriers do not overlap each other when viewed from a front side of said sheet and from a back side of said sheet, so that said sheet may be formed by injection molding by moving a mold in only one direction perpendicular to a plane of said sheet.

8. The sheet for holding information recording carriers according to claim 1, wherein hanging members for hanging said sheet in a cabinet are removably mountable adjacent to opposite ends of said insertion groove.

9. The sheet for holding information recording carriers according to claim 8, wherein mounting projections are formed on said hanging members, and mounting holes in which said mounting projections are to be inserted are formed in said sheet, said hanging members being attachable to said sheet by inserting said mounting projections into said mounting holes.

10. The sheet for holding information recording carriers according to claim 8, wherein mounting holes are formed in said hanging members, and mounting projections to be inserted into said mounting holes are formed on said sheet, said hanging members being attachable to said sheet by inserting said mounting projections into said mounting holes.

11. The sheet for holding information recording carriers according to claim 10, wherein said mounting projections are formed on a back side of at least one of said bottom plates of said rectangular cavities of said sheet.

12. The sheet for holding information recording carriers according to claim 11, wherein when said hanging members for hanging said sheet in said cabinet are used, said hanging members are mountable by inserting said mounting projections formed adjacent to said opposite ends of said insertion groove into said mounting holes formed in said hanging members, and when said hanging members are not being used, said hanging members can be held by inserting said holding projections formed on said backside of said at least one of said bottom plates of said rectangular cavities into said mounting holes formed in said hanging members.

13. The sheet for holding information recording carriers according to claim 12, wherein a holding projection is formed on a side edge of each of said hanging members for firmly holding said hanging member in place.

\* \* \* \* \*